(12) United States Patent
Fischman et al.

(10) Patent No.: US 11,772,965 B2
(45) Date of Patent: Oct. 3, 2023

(54) ALUMINUM SLURRY FUELS AND THEIR METHODS OF USE

(71) Applicant: Massachusetts Institute of Technology, Cambridge, MA (US)

(72) Inventors: Jason Fischman, Stamford, CT (US); Peter Godart, Cambridge, MA (US); Douglas P. Hart, Charlestown, MA (US); Andrew Whitehead, Somerville, MA (US); Jean Sack, Eureka, CA (US); Eric Morgan, Bolton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 101 days.

(21) Appl. No.: 17/138,107

(22) Filed: Dec. 30, 2020

(65) Prior Publication Data
US 2021/0316987 A1 Oct. 14, 2021

Related U.S. Application Data

(60) Provisional application No. 62/984,113, filed on Mar. 2, 2020.

(51) Int. Cl.
  *C01B 3/08* (2006.01)
  *B01J 8/08* (2006.01)
  *H01M 8/0606* (2016.01)

(52) U.S. Cl.
  CPC ............ *C01B 3/08* (2013.01); *B01J 8/085* (2013.01); *B01J 2208/00761* (2013.01); *H01M 8/0606* (2013.01)

(58) Field of Classification Search
  CPC ... C01B 3/08; B01J 8/085; B01J 2208/00761; B01J 19/26; B01J 19/2475; H01M 8/0606; Y02E 60/36; Y02E 60/50
  See application file for complete search history.

(56) References Cited

U.S. PATENT DOCUMENTS

| | | | |
|---|---|---|---|
| 6,849,247 B1 * | 2/2005 | Wagaman | C06B 47/00 423/652 |
| 7,674,443 B1 | 3/2010 | Davis | |

(Continued)

OTHER PUBLICATIONS

International Search Report and Written Opinion dated Mar. 29, 2021, for Application No. PCT/US2020/067433.
(Continued)

*Primary Examiner* — Steven J Bos
*Assistant Examiner* — Syed T Iqbal
(74) *Attorney, Agent, or Firm* — Wolf, Greenfield & Sacks, P.C.

(57) ABSTRACT

A stable aluminum slurry fuel and related systems and methods of use are provided herein. Certain embodiments of the disclosure are related to an aluminum slurry fuel comprising a plurality of aluminum particles dispersed in a carrier fluid. In some embodiments, the aluminum particles comprise an activating composition comprising gallium and/or indium. Additionally, methods of making and using the aluminum slurry fuel are presented herein. For instance, the resultant aluminum slurry fuel may react exothermically with water over a wide range of temperatures to produce hydrogen. The resulting slurry fuel may be used as an energy source for various applications and/or for generating hydrogen for other applications.

24 Claims, 11 Drawing Sheets

(56) References Cited

U.S. PATENT DOCUMENTS

| | | | | |
|---|---|---|---|---|
| 2003/0083208 A1* | 5/2003 | Swanson | ............. | C11D 17/041 |
| | | | | 510/136 |
| 2007/0264312 A1* | 11/2007 | Skaggs | .................. | A23L 29/27 |
| | | | | 426/651 |
| 2012/0085021 A1* | 3/2012 | Centanni | ................... | B03C 3/64 |
| | | | | 422/186.04 |
| 2013/0276769 A1 | 10/2013 | McKay et al. | | |
| 2020/0199728 A1 | 6/2020 | Slocum | | |

OTHER PUBLICATIONS

International Preliminary Report on Patentability dated Sep. 15, 2022, for Application No. PCT/US2020/067433.

Fischman et al., Hydrogen generation via the reaction of an activated aluminum slurry with water. Int J Hydrogen Ener. Jul. 10, 2020; 45 (35): 17118-30.

International Search Report and Written Opinion dated Oct. 4, 2021, for Application No. PCT/US2020/067432.

International Preliminary Report on Patentability dated Sep. 15, 2022, for Application No. PCT/US2020/067432).

\* cited by examiner

ALUMINUM SLURRY FUELS AND THEIR METHODS OF USE

CROSS-REFERENCE TO RELATED APPLICATIONS

This application claims the benefit under 35 U.S.C. § 119(e) of U.S. provisional application Ser. No. 62/984,113, filed Mar. 2, 2020, the disclosure of which is incorporated herein by reference in its entirety.

GOVERNMENT LICENSE RIGHTS

This invention was made with Government support under FA8721-05-C-0002 awarded by the U.S. Air Force. The Government has certain rights in the invention.

BACKGROUND

Energy storage and energy density are factors for the development of technologies across a variety of industries. Particularly in the fields of vehicles, or electrical generators, the use of high energy density fuels may be important as it allows for longer operation and smaller system size. Aluminum's high energy density, alongside its value as a structural material, makes it a promising energy vector for many applications. Specifically, aluminum, when reacted with water, is capable of generating hydrogen and heat. Accordingly, aluminum has been used as a source of hydrogen and heat supply for various applications.

SUMMARY

In one embodiment, an aluminum slurry fuel includes: a carrier fluid; and a plurality of activated aluminum particles dispersed in the carrier fluid, wherein the activated aluminum particles comprise aluminum combined with gallium and/or indium, and wherein the activated aluminum particles are substantially inert relative to the carrier fluid.

In one embodiment, a method of using an aluminum slurry fuel includes: mixing an aluminum slurry fuel with water, wherein the aluminum slurry fuel comprises a carrier fluid and a plurality of activated aluminum particles dispersed in the carrier fluid, wherein the activated aluminum particles comprise aluminum combined with gallium and/or indium, and wherein the activated aluminum particles are substantially inert relative to the carrier fluid.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
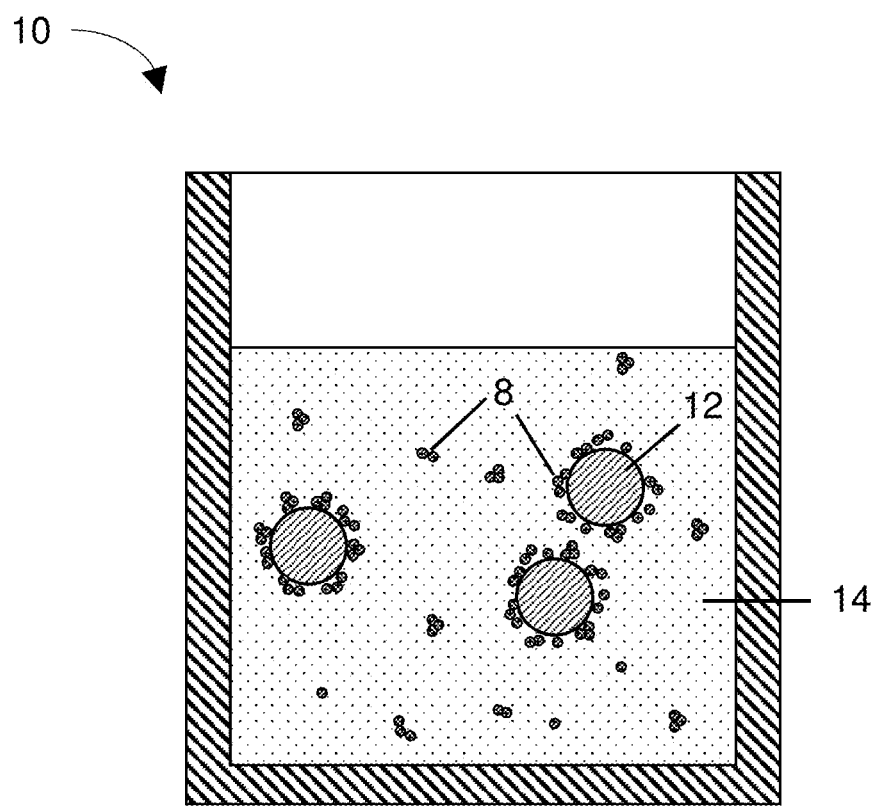
FIG. 1 is a schematic depiction of an aluminum slurry fuel comprising a plurality of activated aluminum particles dispersed in a carrier fluid, according to certain embodiments.

Metal fuels have long been considered as potential hydrocarbon fuel replacements for applications in which high volumetric energy densities are desired. Aluminum, in particular, has an energy density of 83.8 MJ/L, which is roughly double that of diesel, Numerous effective solid aluminum-based fuels have been developed to take advantage of this high energy density. These fuels are typically reacted with water in large batch reaction chambers to produce hydrogen and heat, which in turn are used to power a fuel cell or internal combustion engine. Other designs allow the combustion of solid aluminum particles in a vortex combustor, which is fed via a pellet fluidizing subsystem that transports the particles using an inert carrier gas. These systems are highly effective for large-scale power generation applications in which the size and complexity of the plant is less important; however, for the converse reasoning, these solid-fuel-fed systems are impractical for embedded power systems in applications where volume is constrained (e.g. unmanned and autonomous unmanned vehicles). Additionally, these solid-fuel-fed systems are impractical in that it is often difficult to process and store (e.g., pump, mix, or pressurize) the solids during manufacturing, storage, and use.

The inventors have recognized that compared to solid metal fuels, slurry and liquid fuels offer a number of distinct advantages that significantly improve their practicality for use in the aforementioned, and other possible, applications where it may be desirable to use a compact and/or less complex power generation plant. In particular, slurry and liquid fuels may be pumped from their storage reservoirs, which allow for greater flexibility of the layout of the total power system. Furthermore, compared to powder-based fuels, aluminum slurry fuels may exhibit reduced flammability and improved resistance to spontaneous combustion.

In view of the above, the Inventors have appreciated that the use of an aluminum fuel in the form of a slurry can increase the ease and safety of manufacturing, handling, transporting, and use of the fuel. Accordingly, certain embodiments of the disclosure are related to the formation and use of an aluminum slurry fuel comprising a plurality of activated aluminum particles dispersed in an inert carrier fluid (e.g., oil). Advantageously, the aluminum slurry fuel may have a high energy density and may be easily processed (e.g., pumped, pressurized, and mixed) and stored (e.g., shelf stable for a period of months).

As mentioned, certain embodiments of the disclosure are related to an aluminum slurry fuel comprising a plurality of activated aluminum particles dispersed in a carrier fluid. The term "activated aluminum particles" may refer to aluminum particles that contain an activating composition (e.g., gallium and/or indium) that may facilitate the reaction of aluminum with water, as described elsewhere herein. In some such embodiments, the activated aluminum particles are substantially inert relative to the carrier fluid. That is, the carrier fluid is unreactive to the activated aluminum particles such that the plurality of activated aluminum particles may be stored as a chemically stable dispersion in the carrier fluid for a desired time period prior to use.

In some embodiments, a method of using an aluminum slurry fuel is provided herein. In some such embodiment, the aluminum slurry fuel described herein can be mixed with water to initiate a reaction between water and the activated aluminum particles. Accordingly, water may react with the activated aluminum particles to produce hydrogen, heat, and an aluminum byproduct (e.g., see eq. (1)).

$$2Al + 4H_2O \rightarrow 3H_2 + 2AlO(OH) \qquad (1)$$

According to some embodiments, the aluminum slurry fuel, prior to being mixed with water, is chemically stable and thus can be stored as an energy source for use in various applications and systems. For instance, in one such embodiment, the aluminum slurry fuel may be used as an energy source in a power system. Non-limiting examples of a power system include, but are not limited to fuel cells, combustion systems, reactors, etc. Furthermore, aluminum slurry fuel may serve as a hydrogen source for applications that require the use of hydrogen gas. Compared to hydrogen gas, aluminum slurry fuel can be easier to store and transport, and can allow for on demand generation of hydrogen, as described in more detail below.

In some embodiments, the plurality of activated aluminum may comprise an activating composition that is permeated into the grain boundaries and/or subgrain boundaries of the aluminum to facilitate its reaction with water. For example, the activated aluminum particles may include aluminum combined with gallium and/or indium. In some instances, the activating composition may be an eutectic, or close to eutectic composition, including for example an eutectic composition of gallium and indium. In one such embodiment, the activating composition may comprise gallium and indium where the portion of the activating composition may have a composition of about 70 weight percent (wt %)-80 wt % gallium and 20 wt % to 30 wt % indium though other weight percentages are also possible. Without wishing to be bound by theory, gallium and/or indium may permeate through the one or more grain boundaries and/or subgrain boundaries of the reactant (e.g., metals such as aluminum). For instances, the activating composition may be incorporated into an alloy with the reactant (e.g., metals such as aluminum), A metal alloy may comprise any activating composition in any of a variety of suitable amounts. In some embodiments, for example, the metal alloy comprises greater than or equal to 0.1 wt % of the activating composition, greater than or equal to 1 wt %, greater than or equal to 5 wt %, greater than or equal to 15 wt %, greater than or equal to 30 wt %, or greater than or equal to 45 wt % of the activating composition based on the total weight of the metal alloy. In certain embodiments, the metal alloy comprises less than or equal to 50 wt %, less than or equal to 40 wt %, less than or equal to 30 wt %, less than or equal to 20 wt %, less than or equal to 10 wt %, less than or equal to 5 wt %, or less than or equal to 1 wt % of the activating composition, based on the total weight of the metal alloy. Combinations of the above recited ranges are also possible (e.g., the metal alloy comprises greater than or equal to 0.1 wt % and less than or equal to 50 wt % of the activating composition based on the total weight of the metal alloy, the metal alloy comprises greater than or equal to 1 wt % and less than or equal to 10 wt % of the activating composition based on the total weight of metal alloy). Other ranges are also possible.

In some embodiments, the plurality of activated aluminum particles may be present in any appropriate amount in the aluminum slurry fuel. In some embodiments, the plurality of activated aluminum particles may be present in an amount of greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 65%, greater than or equal to 70 wt %, greater than or equal to 75 wt %, or greater than or equal to 80 wt % of a total weight of the aluminum slurry fuel. In some embodiments, the plurality of activated aluminum particles may be present in an amount of less than or equal to 90 wt %, less than or equal to 80 w1%, less than or equal to 75 wt %, less than or equal to 70 wt %, less than or equal to 65 wt %, less than or equal to 60 wt %, less than or equal to 50 wt %, less than or equal to 40 wt %, less than or equal to 30 wt %, less than or equal to 20 wt %, less than or equal to 15 wt %, or less than or equal to 10 wt % the total weight of the aluminum slurry fuel. Combinations of the above-referenced ranges are also possible (e.g., greater than or equal to 10 wt % and less than or equal to 70 wt %; greater than or equal to 60 wt % and less than or equal to 70 wt % or greater than or equal to 65 wt % and less than or equal to 70 wt %). Other ranges are also possible.

In some embodiments, the plurality of activated aluminum particles may have any of a variety of average particle sizes corresponding to an average maximum dimension of the particles. The average particle size may be any suitable average, such as a number-based average, volume-based average, or intensity-based average (otherwise known as Z-average). In some cases, the plurality of active aluminum particles may have an average size of greater than or equal to 10 μm, greater than or equal to 50 μm, greater than or equal to 100 μm, greater than or equal to 150 μm, greater than or equal to 200 μm, greater than or equal to 300 μm, or greater than or equal to 400 μm. In some embodiments, the plurality of active aluminum particles may have an average particle size of less than or equal to 500 μm, less than or equal to 400 μm, less than or equal to 300 μm, less than or equal to 200 μm, less than or equal to 150 μm, less than or equal to 100 μm, or less than or equal to 10 μm. Combinations of the above-referenced ranges are also possible (e.g., greater than or equal to 100 μm and less than or equal to 200 μm, or greater than or equal to 100 μm and less than or equal to 500 μm), Other ranges are also possible.

It should be noted that the plurality of activated aluminum particles may have any suitable shape. For instance, the particles may be regularly shaped, such as spherical, or may be irregularly shaped chunks. Thus, it should be understood that the solid reactant may be provided in any appropriate powder form and may have any appropriate shape and/or size distribution for a desired application.

In some embodiments, a reactant may be provided in the form of a slurry that combines the reactant material (e.g., activated aluminum particles) with a non-reactive carrier fluid (e.g., an inert carrier fluid). For example, a slurry may include particles of the reactant material suspended in an inert fluid, e.g., a fluid that is substantially unreactive to the activated aluminum particles. In some embodiments, the fluid may be an oil, such as mineral oil, silicone oil, canola oil, or olive oil. In other embodiments, the fluid may be a grease, alcohol, or other appropriate material capable of suspending the reactant material in solution. In some embodiments, the diameter of the particles in the slurry may be between approximately 10 micrometers to 200 micrometers, 20 micrometers to 50 micrometers, and/or any other appropriate size range depending on the particular embodiment. In one embodiment, a slurry may be produced in a colloid mill, although other methods of producing a slurry are also contemplated as the disclosure is not limited in this regard.

It should be understood that a slurry may have any appropriate ratio of the reactant (e.g., activated aluminum particles) to carrier fluid by weight. Further, without wishing to be bound by theory, the ratio of the reactant material to carrier fluid in the slurry may affect both the physical properties of the slurry as well as the performance of the system. For example, a slurry that has a reactant/carrier ratio of 90:10 by weight may be characterized as a paste, whereas a slurry with a 50:50 ratio may flow more easily. In some applications, a reactant/carrier ratio as low as 10:90 may be desirable. Accordingly, a ratio of a reactant to carrier fluid by weight may be between about 10:90 and 90:10, though other appropriate ranges both greater and less than those noted above are also contemplated.

The aluminum slurry fuel may have any of a variety of appropriate viscosities. In some embodiments, the aluminum slurry fuel may have a viscosity (e.g., a zero shear viscosity) of greater than or equal to 100 Pa·s, greater than or equal to 500 Pa·s, greater than or equal to 1,000 Pa·s, greater than or equal to 5,000 Pa·s, greater than or equal to 10,000 Pa·s, or greater than or equal to 50,000 Pa·s. In some embodiments, the aluminum slurry fuel may have a viscosity of less than or equal to 100,000 Pa·s, less than or equal to 50,000 Pa·s, less than or equal to 10,000 Pa·s, less than or equal to 5,000 Pa·s, less than or equal to 1,000 Pa·s, or less than or equal to 500 Pa·s. Combination of the above-referenced ranges are possible (e.g., greater than or equal to 100 Pa·s and less than or equal to 100,000 Pa·s; or greater than or equal to 1,000 Pa·s and less than or equal to 100,000 Pa·s). Other ranges are also possible.

In some embodiments, the aluminum slurry fuel may have a viscosity that is relatively independent of temperature over a desired operating temperature range. In some such embodiments, the viscosity (e.g., zero shear viscosity) at a second temperature (e.g., about 50° C.) may vary less than 10 times (e.g., less than 8 times, less than 5 times, less than 2 times, less than 0.5 times) from the viscosity at a first temperature (e.g., about 5° C.). In some such embodiments, the aluminum slurry fuel is relatively stable when subjected to a temperature between a first temperature and a second temperature.

In some embodiments, the carrier fluid may be present in any of a variety of appropriate amounts in the aluminum slurry fuel. In some embodiments, the carrier fluid may be present in an amount of greater than or equal to 5 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, or greater than or equal to 80 wt % of the aluminum slurry fuel. In some embodiments, the carrier fluid may be present in an amount of less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 35 wt %, less than or equal to 20 wt %, or less than or equal to 10 wt % of the total weight of aluminum slurry fuel. Combinations of the above-referenced ranges are also possible (e.g., greater than or equal to 5 wt % and less than or equal to 90 wt %; greater than or equal to 10 wt % and less than or equal to 40 wt % or greater than or equal to 30 wt % and less than or equal to 40 wt %). Other ranges are also possible.

The carrier fluid may have any of a variety of viscosities. In some embodiments, a carrier fluid having a relatively high viscosity (e.g., a viscous oil) can advantageously result in aluminum slurry fuel having a longer shelf life. Additionally or alternatively, the carrier fluid may be a shear thinning fluid, and/or may contain additives that impart shear thinning properties to the carrier fluid. According to some embodiments, a high viscosity and shear thinning carrier fluid (e.g., oil), such as the ones described herein, may be used to form a slurry fuel having advantageous properties. In some such cases, the carrier fluid may exhibit a relativity high viscosity when at rest, which allows for a long settling time of the aluminum particles, and at the same time exhibit a lower viscosity when being sheared during use (e.g., such that it can be easily flowed through a pipe and reduce pumping losses). Advantageously, the fuels formed using this method may have a settling time of months, and may be capable of being pumped through pipes having relatively small diameters (e.g., as small as 1/16"), while displaying homogeneous steady flow and little, if any, particle jamming or aggregation during flow.

In some embodiments, a carrier fluid may have a viscosity (e.g., zero shear viscosity, or viscosity at rest) of greater than or equal to 50 centistokes (cSt), greater than or equal to 100 cSt, greater than or equal to 250 cSt, greater than or equal to 500 cSt, greater than or equal to 750, greater than or equal to 1,000 cSt, greater than or equal to 2,000 cSt, greater than or equal to 4,000 cSt, greater than or equal to 6,000 cSt, or greater than or equal to 8,000 cSt, in some embodiments, the carrier fluid may have a viscosity of less than or equal to 10,000 cSt, less than or equal to 8,000 cSt, less than or equal to 6,000 cSt, less than or equal to 4,000 cSt, less than or equal to 2,000 cSt, less than or equal to 1,000 cSt, less than or equal to 750 cSt, less than or equal to 500 cSt, less than or equal to 250 cSt, or less than or equal to 100 cSt. Combinations of the above-referenced ranges are also possible (e.g., greater than or equal to 50 cSt and less than or equal to 1,000 cSt; or greater than or equal to 100 cSt and less than or equal to 10,000 cSt). Other ranges are also possible.

In some embodiments, an aluminum slurry fuel described herein may include additives. For instance, the additives may include rheology modifiers that may be used to tune or control the fluidic behavior of the aluminum slurry fuel. For example, in some cases, these additives may be used to adjust the flow or rheological properties (e.g., viscosity, storage modulus $G'$, viscous modulus $G''$, etc.) of the aluminum slurry fuel. For instance, in one set of embodiments, an aluminum slurry fuel without additives may exhibit a non-Newtonian behavior, such that the slurry shear thickens when subjected to a shear stress. In another embodiment, additives (e.g., rheology modifiers) may be added to the aluminum slurry fuel to enhance the flowability of the slurry (e.g., prevent shear thickening behavior), such that the aluminum slurry fuel can be more easily processed, or flowed, during operation. For instance, the addition of certain additives may transform the rheology behavior of the aluminum slurry fuel from a shear thickening fluid to a Newtonian fluid, or in some cases, to a non-Newtonian shear thinning fluid. Non-limiting examples of additives that can be used to induce shear thinning of the aluminum slurry fuel include, but are not limited to, fumed silica (FS), bentonite, and kaolin.

Additionally or alternatively, certain additives may be used as a thickener to increase the viscosity of the carrier fluid, such that the plurality of activated aluminum particles may stay suspended in the carrier fluid for a longer period of time, and thereby resulting in a longer shelf life of the aluminum slurry fuel. Non-limiting example of additives that can be used as thickeners include, but are not limited to, fumed silica (FS), xanthan gum, glycerol monostearate, and lecithin.

Additionally or alternatively, certain additives may have additional functionalities as one or more of an anti-settling agent, a free-flow agent, and/or an anti-caking agent. For example, in one se of embodiments, fumed silica (FS), in addition to being used as a rheology modifier (to induce shear thinning of the aluminum slurry fuel), can also be used as a thickener, an anti-settling agent, a free-flow agent, and an anti-settling agent. In some embodiments, the additives are substantially hydrophobic such that they can disperse uniformly in the carrier fluid.

In some embodiments, the additives (e.g., fumed silica) may be present in any appropriate amount in the aluminum slurry fuel. In some embodiments, the additives (e.g., fumed silica) may be present in an amount of greater than or equal to 0.5 wt %, greater than or equal to 1 wt %, greater than or equal to 1.5 wt %, greater than or equal to 2 wt %, greater than or equal to 2.5 wt %, greater than or equal to 3 wt %, greater than or equal to 3.5 wt %, greater than or equal to 4.0 wt %, greater than or equal to 4.5 wt %, greater than or equal to 5 wt %, greater than or equal to 6 wt %, greater than or equal to 7 wt %, greater than or equal to 8 wt %, or greater than or equal to 9 wt % of the aluminum slurry fuel. In some embodiments, the additives may be present in an amount of less than or equal to 10 wt %, less than or equal to 9 wt %, less than or equal to 8 wt %, less than or equal to 7 wt %, less than or equal to 6 wt %, less than or equal to 5 wt %, less than or equal to 4.5 wt %, less than or equal to 4 wt %, less than or equal to 3.5 wt %, less than or equal to 3 wt %, less than or equal to 2.5 wt %, less than or equal to 2 wt %, less than or equal to 1.5 wt %, or less or equal to 1 wt % of the total weight of aluminum slurry fuel. Combinations of the above-referenced ranges are also possible (e.g., greater than or equal to 1 wt % and less than or equal to 10 wt %; or equal than or equal to 1 wt % and less than or equal to 4 wt %). Other ranges are also possible.

In some embodiments, methods of making and using the aluminum slurry fuel are provided herein. As mentioned, according to certain embodiments, solid aluminum may be treated with an activating composition described herein to increase it reactivity with water. The activated solid aluminum may have any appropriate initial physical form including plates, pellets, blocks, and/or any other form as the disclosure is not limited in this fashion.

In accordance with certain embodiments, the activated aluminum may be processed into an aluminum slurry fuel that includes a plurality of activated aluminum particles dispersed in a carrier fluid (e.g., an oil). In some embodiments, the shape and/or size of the activated aluminum particles may be tailored to a size suitable for the specific application using methods understood to a person of ordinary skill in art. For example, in some embodiments, the size of the activated aluminum particles may be altered using milling (e.g. ball mill, cryo-mill, rotor mill, knife mill, jet mill, colloidal mill etc.) and/or jet cutting, laser cutting, mortar and pestle, and/or any other appropriate manufacturing method that is capable of producing a plurality of activated aluminum particles described herein. For instance, in one set of embodiments, a colloidal mill may be used to grind a mixture comprising the activated solid aluminum, a carrier fluid, and other potential additives into the aluminum slurry fuel described herein.

In some embodiments, the resultant aluminum slurry fuel may be combined with water in a reactor, as described in more detail below. By combining the resultant aluminum slurry fuel with water, in accordance with certain embodiments, the aluminum particles react with water to generate hydrogen and heat.

In some embodiments, a power system using an aluminum slurry fuel described previously is provided herein. In some such embodiments, the aluminum slurry fuel may be used as a power source for any of a variety of power systems described herein.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic representation of one embodiment of an aluminum slurry fuel 10. In this embodiment, the aluminum slurry fuel 10 comprises a plurality of activated aluminum particles 12 dispersed in a carrier fluid (e.g., an oil) 14. The activated aluminum particles and the carrier fluid may have any appropriate properties described herein. For example, the carrier fluid may be a viscous oil (e.g. silicone oil, mineral oil, etc.). Further, the activated aluminum particles may comprise aluminum combined with gallium and/or indium. The aluminum particles used in this aluminum slurry fuel can be made by either grinding aluminum that has been embrittled with gallium and indium, or by milling the aluminum into powder as described above.

The particle size of the aluminum powders used can be any of a variety of sizes as described herein (e.g., about 400 μm), although smaller particles may be advantageous in that they allow for longer settling times and smoother flow of the resultant slurry fuel. The aluminum particles are then mixed into viscous oil in high mass fractions as described herein. For example, the mass fractions of aluminum particles may be about 60-70% aluminum or higher, since higher mass fractions can advantageously allow for higher energy density of the resulting slurry fuel.

Referring again to FIG. 1, the aluminum slurry fuel 10 may comprise an additive (e.g., finned silica) 8 that imparts the aluminum slurry fuel 10 its shear-thinning property. As shown, the additives may be added and dispersed uniformly in the carrier fluid 14, and a portion of the dispersed shear-thinning additives may substantially coat the surface of the plurality of activated aluminum particles 12 to form a shell around the particles 12. The shell of additives may, in certain instances, prevent the aluminum particles from aggregating together as a result of an attractive intermolecular force (e.g., Van der Waals). In some embodiments, additives may advantageously act as both a thickener and a shear-thinning additive. For example, in addition to its shear-thinning characteristics, fumed silica can act as a thickener, an anti-caking agent, and an anti-caking agent of the carrier fluid and/or aluminum slurry fuel described herein. Fumed silica may be used in any of a variety of amounts described herein, e.g., such as 1% to 4% by mass in the aluminum slurry fuel.

According to some embodiments, as shown in FIG. 2, a method of using an aluminum slurry fuel by mixing the aluminum slurry fuel (e.g., the slurry 10 of FIG. 1) with water is provided herein. FIGS. 2A-2D are schematic depictions the progression of oil separating off from the activated aluminum particles in the presence of water, in accordance with certain embodiments.

Figure 2A:
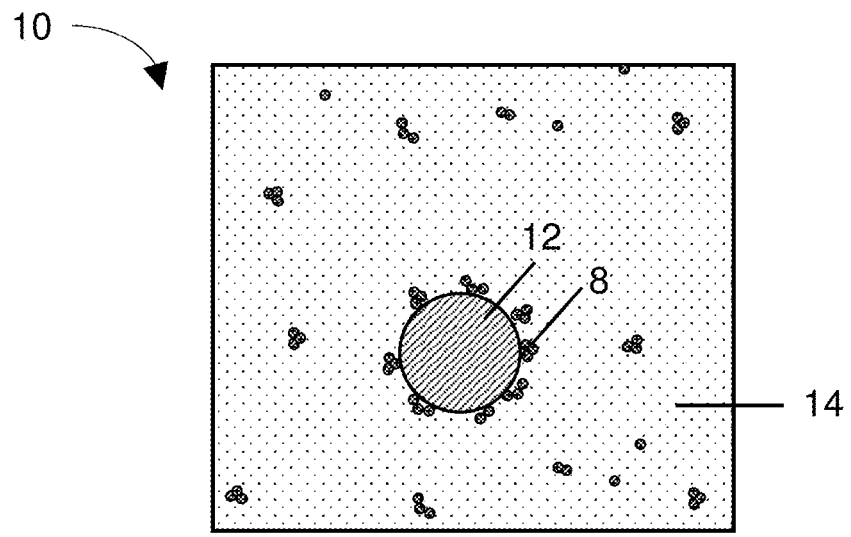
FIG. 2A is, according to certain embodiments, a schematic depiction of an aluminum particle suspended in oil.

FIG. 2A shows an aluminum slurry fuel 10 comprising an activated aluminum particle 12 coated with additives 8 and dispersed in a carrier fluid 14 containing dispersed additives. It should be noted that the additives may be unreactive and inert, e.g., such that the additives do not substantially participate in or interfere with the water-aluminum reaction described in herein. For illustration purposes only, a single (out of the plurality of) activated aluminum particles from FIG. 1 is shown in FIGS. 2A-2D. As mentioned, the fuel can be made by mixing high mass concentrations of reactive aluminum powder into a viscous oil or other carrier fluid. This can result in a suspension of aluminum particles in the oil.

Figure 2B:
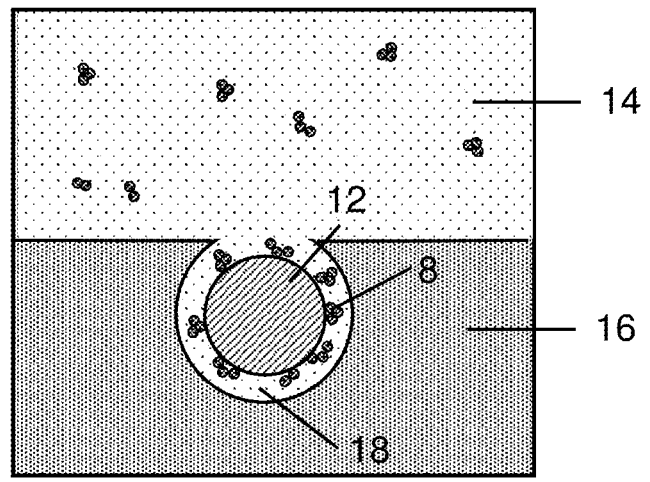
FIG. 2B depicts the solution of FIG. 2A with water added to the solution with oil remaining on the surface of the aluminum particle, according to some embodiments.
Figure 2C:
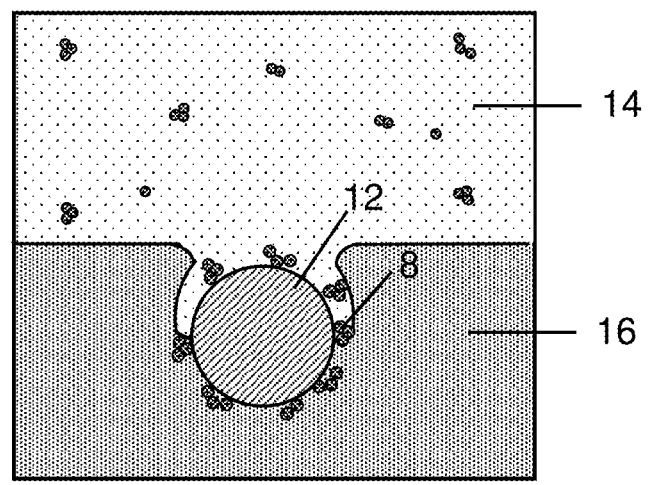
FIG. 2C depicts the solution of FIG. 2A with water added to the solution as the oil begins to bead up and the water preferentially wets to the aluminum, according to some embodiments.
Figure 2D:
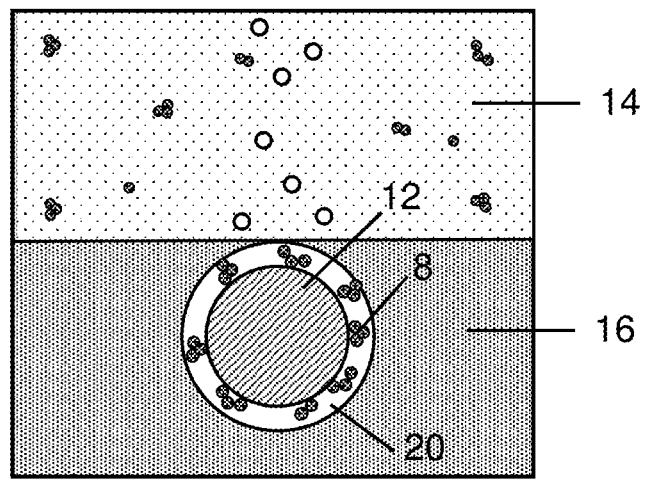
FIG. 2D depicts the solution of FIG. 2A with water added to the solution as the water begins to react with the aluminum, according to some embodiments.

Referring to FIG. 2B, the aluminum slurry fuel 10 has been mixed with water 16. As shown, a shell 18 comprising the carrier fluid has initially remained around the activated aluminum particles 12, thereby separating the activated aluminum particle 12 from water 16. However, as the carrier fluid shell 18 begins to bead up into the carrier fluid 14, the activated aluminum particle 12 begins to contact the water 16 (e.g., as shown in FIG. 2C). For example, upon mixing the fuel with water, the fuel may leverage the natural oleophobic properties of aluminum to allow the oil to separate off from the aluminum particles and come into direct contact with the water. As such, this may allow the aluminum particle to maintain its reactivity despite the presence of oil. Accordingly, as the water 16 gains exposure to the surface of the activated aluminum particle 12, the aluminum particle 12 reacts with the water 16 to generate a shell 20 of reaction products comprising hydrogen and oxidized aluminum around the aluminum particle (e.g., as shown in FIG. 2D). As shown, hydrogen that has been generated in the shell 20 at the surface of the aluminum particles can subsequently rise up (e.g., as a result of the density difference) through the liquid phases 14 and 16, It should be noted that the mixing of the single activated aluminum particle with water in FIGS. 2A-2D is representative of the mixing of the plurality of activated aluminum particles (e.g., as shown in 10 in FIG. 1) with water. In some embodiments, the generated hydrogen may be subsequently sequestered and used in a power system (e.g., fuel cell, combustion systems, etc.) and/or stored for subsequent use as described herein.

In some embodiments, the mixing and reacting of water with aluminum particles described with respect to FIGS. 2A-2D may be carried out in a continuous flow reactor, a batch reactor, and/or any other appropriate system. The reaction may occur at a variety of temperatures and/or pressures in a reactor.

In some embodiments, the reaction may be carried out a temperature of greater than or equal to 20° C., greater than or equal to 25° C., greater than or equal to 30° C., greater than or equal to 40° C., greater than or equal to 60° C., greater than or equal to 80° C., greater than or equal to 100° C., greater than or equal to 150° C., greater than or equal to 200° C., greater than or equal to 250° C., greater than or equal to 300° C., or greater than or equal to 350° C. In some embodiments, the reaction may be carried out at a temperature of less than or equal to 375° C., less than or equal to 350° C., less than or equal to 300° C., less than or equal to 250° C., less than or equal to 200° C., less than or equal to 150° C., less than or equal to 100° C., less than or equal to 80° C., less than or equal to 60° C., less than or equal to 40° C., less than or equal to 30° C., or less than or equal to 25°

C. Combination of the above-referenced ranges are possible (e.g., greater than or equal to 25° C. less than or equal to 100° C., or greater than or equal to 20° C. and less than or equal to 375° C.). Other ranges are also possible.

In some embodiments, the reaction may be carried out at any of a variety of pressures. In some embodiments, the reaction may be carried out at a pressure of greater than or equal to 1 bar, greater than or equal to 10 bar, greater than or equal to 50 bar, greater than or equal to 100 bar, greater than or equal to 200 bar, greater than or equal to 300 bar, or greater than or equal to 400 bar. In some embodiments, the reaction may be carried out at a pressure of less than or equal to 500 bar, less than or equal to 400 bar, less than or equal to 300 bar, less than or equal to 200 bar, less than or equal to 100 bar, less than or equal to 50 bar, or less than or equal to 10 bar. Combination of the above-referenced ranges are possible (e.g., greater than or equal to 1 bar and less than or equal to 500 bar). Other ranges are also possible. In one set of embodiments, the reaction is carried out at atmospheric pressure though pressurized reactions greater than atmospheric pressure, as well as reactions carried out at pressures less than atmospheric pressure, are also contemplated as the disclosure is not limited to what pressure the reaction is carried out at.

Example: Prior System Review

The development of aluminum slurry fuels has largely fallen into two categories, combustible fuels and water-reactive fuels. Early studies showed that pure aluminum particles suspended in a carrier fluid could be ignited at temperatures exceeding 1500 K. Recent developments have shown that for sufficiently small particle sizes (i.e. 300 nm), an aluminum-water slurry containing up to 27 wt % can spontaneously ignite at temperatures as low as 303 K. These combustible fuels benefit from the tact that no additional materials are required for enabling oxidation of the fuel; however, the elevated temperatures required for this process to occur may be prohibitive for some applications.

In the other category comprised of water-reactive aluminum slurry fuels, prior work has shown that aluminum particles suspended in a paraffin oil can be reacted with an alkaline aqueous solution comprised of 10 wt % NaOH at room temperature (25° C.). While effective, this method requires NaOH, which may be prohibitive for using ambient water as an oxidizer.

The experimental examples elaborated on below confirm that a slurry fuel including activated aluminum particles may be used for reactions with untreated water at low temperatures in some embodiments.

Example: Slurry Production

Under moderate temperature and pressure conditions, the oxidation of bulk aluminum by air or water is greatly impeded by the presence of a strong and quickly-forming oxide layer. This oxide layer, however, may be passivated using a gallium-indium surface treatment. To demonstrate this, macro-scale (>1 mm) aluminum pellets were surface treated with a gallium-indium eutectic in the liquid phase. Once the eutectic had been given sufficient time to permeate the grain boundary network of the aluminum (typically 48-72 hours), the resultant activated bulk fuel could react readily with water to >95% completion. In the process, this exothermic reaction could generate hydrogen and a hydrated aluminum oxide whose composition depended on the ambient temperature and pressure conditions at the reaction site.

Once activated, this bulk fuel was ground into a powder and suspended in oil to create a water-reactive slurry that alloys for hydrogen generation at temperatures above the freezing point of water. Aluminum has natural oleophobic properties that allow it to preferentially wet to water in the presence of oil. This allowed for the suspension of aluminum in oil without hindering its ability to react with water. When the aluminum-oil slurry came into contact with water, the oil that covered the aluminum particles could bead up and separate from the aluminum, making way for the water. This allowed for the aluminum-water reaction to proceed, as described previously with respect to FIG. 2.

When attempting the suspension of dense particles, such as aluminum in oil, there was a natural tendency for these particles to fall out of suspension due to their density exceeding that of the carrier oil. The rate at which the particles fall out of suspension can be estimated using Equation (1) (Stokes settling velocity), which determines the terminal velocity of spheres through a fluid undergoing creeping flow:

$$V_t = gd^2/18\mu(\rho_s - \rho) \quad (2)$$

where $V_t$ is the terminal velocity of the sphere, d is the diameter of the sphere, g is the acceleration due to gravity, $\mu$ is the viscosity of the liquid, and $\rho$ and $\rho_s$ are the densities of the fluid and sphere respectively. Each of these variables could then be tuned with the objective of lowering a particles terminal velocity, and thus increasing a particle's settling time, which was desirable for creating a stable slurry. While g, $\rho$, and $\rho_s$ are comparatively fixed here, because aluminum had a set density and the density of commercial oils had only slight variability, both d and $\mu$ could be tailored to produce a slower terminal velocity.

From Equation (1), to maximize settling time, the diameter of the aluminum particles may be reduced. In practice, however, to avoid possible combustion issues, particle sizes were limited to 200 μm in the current study so that the particles could be as small as possible while still maintaining a low combustion risk during fuel production. However, other applications may use smaller particles.

The viscosity of the oil could also be increased in order to decrease the terminal velocity of the particles. Increasing fluid viscosity, however, would also increase the pressure used to pump the fluid through a tube. This trade-off may problematic, as low pumping losses, and long fuel shelf-life are both desirable for an effective slurry fuel. While several techniques could be used to suspend the particles without increasing the fluid viscosity, such as using surfactants, the most successful was to make the oil shear-thinning. This meant that the suspension may exhibit high viscosity under low shear rates (i.e. at rest), and may exhibit much lower viscosity under high shear rates (i.e. while being pumped) in some embodiments. This allowed for a fuel that maintained a very long settling time, without any associated large pumping losses.

To produce a slurry, the aluminum used for this fuel was activated using the surface treatment method described earlier. The fuel was then ground into powder using a grain mill, and the resulting powder was sieved, allowing only particles smaller than 200 μm to pass through and be used for the slurry fuel. This grinding was performed in the presence of argon, and all work involving aluminum powder was done in a fume hood while wearing a face mask for safety. The blades of the grain mill were also checked regularly to ensure that they exhibited no embrittlement or fracture. All powders ground for these tests were stored in airtight containers that had been filled with argon gas.

Initial observations of aluminum powder mixed into pure oil showed settling times of only a few minutes. This was seen for both silicone oil as well as mineral oil, even with viscosities as high as 1000 cSt. Various methods were then attempted to increase this settling time. Surfactants and thickeners, such as xanthan gum; glycerol monostearate, and lecithin, were explored, before settling on fumed silica, as it was seen to have the best results in initial tests. Fumed silica (FS) is a commercially available polymer that acts as a thickener and also creates shear thinning properties in a liquid when mixed into it. This occurs because the FS is a polymer chain that interlocks with other FS polymer chains when at rest creating a viscous fluid. When under shear, these chains straighten out and can easily slide past each other, allowing the slurry to flow more easily.

The finned silica used in these tests was procured from Aerosil and has several other advantageous properties as well, Aerosil fumed silica is advertised as an anti-settling agent, and as a free flow and anti-caking agent. These properties are achieved by the distribution of FS particles around any suspended particles. The FS then forms a sort of shell around the particles, keeping them from clumping together as seen in FIG. 1. FS can also be made in both hydrophobic and hydrophilic forms. Hydrophobic FS was used for these tests so that it would disperse well in the oil and so that it would separate easily from any water.

When preparing oil samples for testing, the proper masses of fumed silica and oil were carefully added to a jar and mixed lightly. This mixture was then brought to a high shear rate mixer where the slurry was mixed at 2000 rpm with a peripheral velocity of 4 m/s for 3-5 minutes until the slurry appeared uniform. This mixing process was followed for all samples, as advised by the FS manufacturing corporation, Aerosil. Once the oil-FS mixture was prepared, the desired mass of aluminum powder was then poured into the oil, and the two were mixed carefully until a homogenous suspension was observed.

Initial testing was done using silicone oil as the carrier fluid, however the viscosity of this oil was seen to degrade over time when mixed with FS. For all later tests, and all data presented below, Light Mineral Oil supplied by W.S. Dodge Oil Co. Inc. was used as the carrier fluid. This mineral oil showed no degradation to its viscosity over time and produced stable slurry aluminum fuel. The FS used in all tests was Aerosil R812 unless otherwise noted.

Example: Rheology Testing Methodology

A rheometer was used to perform several sets of tests in order to characterize how different changes to the fuel's composition impacted its final viscosity. These changes include varied mass fractions of FS, varied mass fractions of aluminum, and changes in system temperature. For each of these tests, a rheometer was used to determine the viscosity of the slurry across a wide range of shear rates in order to understand how it would behave both at rest, and while being pumped. All tests were performed on an AR G2 rheometer, and each test was performed at least twice to ensure consistency and reduce sampling error.

Example: Reaction Testing Methodology

The final sets of testing that were done for the characterization of the slurry aluminum fuel were reaction completion tests. These were done to ensure that no aspects of producing the slurry aluminum fuel lowered the reaction yield in any way. These tests were done on 4 different types of fuel: solid aluminum spheres, aluminum powder, and two types of slurry aluminum fuel. Their reaction yields were then compared, to determine the relative performance of the slurry fuels.

In order to measure the reaction yield, fuel samples were weighed and reacted in an excess of water in a small flask. The hydrogen evolved from the aluminum-water reaction was passed from the flask into an inverted graduated cylinder initially filled with water. The hydrogen volume was measured by measuring the volume of displaced water at the end of the reaction test. Contributions to this volume from humidity in the graduated cylinder as well as hydrostatic pressure from the water column were accounted for and subtracted from the final hydrogen volume measurement. Fuel reactivity was then determined by dividing the adjusted hydrogen yield by the theoretical maximum stoichiometric hydrogen yield from equation (1) reproduced below, $$2Al + 4H_2O \rightarrow 3H_2 + 2AlO(OH)$$

which was the expected aluminum water reaction given that the samples were being reacted at atmospheric pressure and temperatures between 25 and 100° C.

Example: Baseline Aluminum Spheres

Test 1 was performed using solid activated aluminum spheres, which was used here as a baseline control. These 6 mm spheres were prepared, surface treated using 7% gallium-indium eutectic by mass, and their reactivity was measured using the aforementioned procedure.

Example: Baseline Aluminum Powder

Test 2 was performed using ground aluminum powder that was made out of pellets from the same batch used in test 1. Once ground into powder, and before being placed in oil, the aluminum can be extremely volatile and may begin to react with oxygen or water vapor in the air. For this reason, the powder was ground and stored in argon, however it was still in contact with air at various transfer points in the grinding process. The difference between the reaction completions observed in test 1 and 2 may indicate the extent of this reaction with air.

The reaction tests for test 2 were performed in much the same manner as test one, with only slight changes to account for the use of powder rather than solid pellets. At the start of each test, the jar of aluminum powder was thoroughly mixed, and a small bit of powder, approximately 0.3 g, was placed in the reaction flask. This flask was weighed before and after the placement of the fuel in order to determine the precise mass of powder added in each test. The water was then added, and the reaction yield measured, One notable occurrence is that the aluminum powder reaction was so violent that it often sent powder scattering across the flask walls when it began. When this was observed, the flask was shaken lightly to ensure that water could reach all of the powder scattered across the walls.

Example: Activated Aluminum Fuel Slum/Hydrophobic FS

Test 3 was performed using a slurry aluminum fuel mixture, comprised of 65% aluminum, 2.8% hydrophobic FS, and 31.8% mineral oil by mass. This hydrophobic FS was the same Aerosil R812 FS that had been used in all previous tests. The aluminum powder used to make this slurry fuel was taken from the same mixed jar of powder as was used for test 2. Additionally, the powder was added to the oil sample immediately after all powder testing was complete. Therefore, any air exposure that was experienced by the aluminum particles in test 2 was also experienced by the aluminum particles in test 3. This was done to ensure that the differences in reaction yield observed between tests 2 and 3 were only differences due to the presence of the oil and FS.

The reaction testing for test 3 was done by using a 1 mL syringe to deposit a known volume of fuel into a flask. This flask was weighted before and after the deposition of the fuel in order to determine the mass of the fuel as well. Once the mass was determined, the flask was corked and connected to a reaction yield setup. Notably, the reaction of Shiny took significantly longer to occur as compared to solid aluminum fuel, and therefore all tests were allowed to proceed for at least a half an hour. The reaction rate was observed to be highly dependent on the manner in which the fuel was deposited into the jar, due to variations in the surface area of the deposited fuel from sample to sample. Additionally, the reaction rate was also seen to exhibit significant temperature dependence. This was to be expected, as not only was this aluminum fuel known to react more quickly at elevated temperatures, but the oil's viscosity and surface tension would also decrease at elevated temperatures, expediting its separation from the aluminum.

Example: Activated Aluminum Fuel Slurry, Hydrophilic FS

Test 4 was a slurry aluminum fuel mixture, comprised of 65% aluminum, 1.4% hydrophilic FS, and 33.4% mineral oil, by mass. While FS can be commercially purchased in both hydrophobic and hydrophilic variations, all tests described thus far only used the hydrophobic FS. This was because it was theorized that the FS should be hydrophobic so that it will easily separate away from the aluminum when in contact with water. This hypothesis was tested to determine if the use of hydrophilic FS would, in fact, obstruct the aluminum-water reaction.

A smaller concentration of FS was used for this test than what was used in test 3. This was because hydrophilic FS thickens oil more effectively that hydrophobic FS, and so 1.6% hydrophilic FS was sufficient to produce a fuel mixture at the same viscosity as 3.2% hydrophobic FS. It was desired that the fuel in test 3 and 4 have similar viscosities, so that any lack of separation between the aluminum and oil would not be due to increased oil viscosity, but rather due to the hydrophilic nature of the FS. The FS used in this test was Aerosil 300, and the reaction completion tests were done in the same manner as was described for test 3.

Example: Viscosity Testing

Four different mineral oil samples were prepared, each with different mass fractions of fumed silica added. These mass fractions were 0%, 4%, 6%, and 8%. The viscosities of these samples were then measured on a rheometer across a wide range of shear rates, and the results can be found in FIG. 3. This set of testing was done before any aluminum had been added to the sample, in order to observe only the effects of the fumed silica on the oil.

Figure 3:
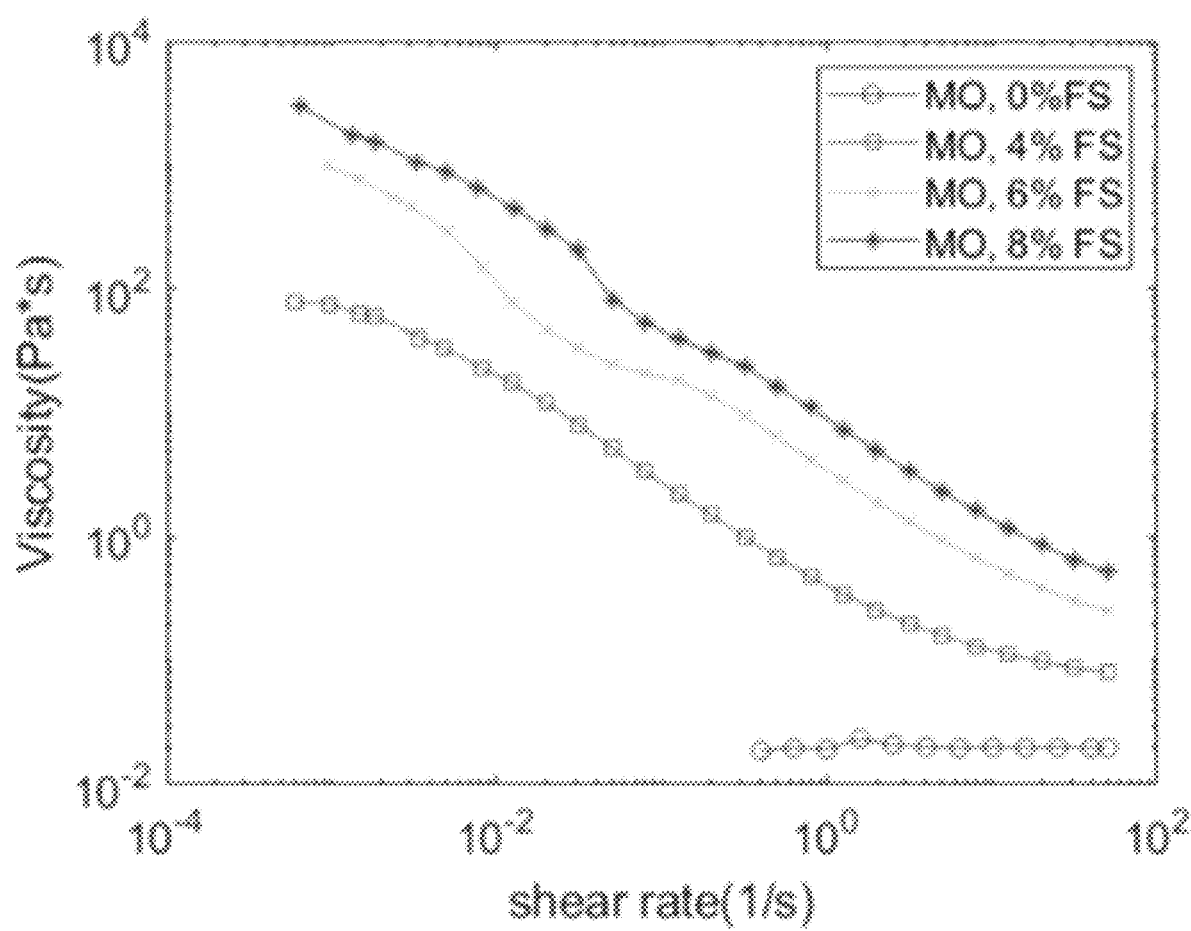
FIG. 3 is a graph that plots mineral oil viscosity as a function of shear rate for mineral oil mixtures with 0%, 4%, 6%, and 8% mass fractions of fumed silica (FS), according to some embodiments.

As seen in FIG. 3, the addition of fumed silica had a rather drastic effect on the viscosity of the oil. Additionally, the viscosity of the oil-FS mixture was linear when plotted against shear rate on a log-log curve. This meant that the slurry could be fitted to a standard shear thinning profile and generalized by a power-law fluid as shown in Equation (3):

$$\mu_{eff} = K(\gamma)^{n-1} \quad (3)$$

In this equation, $\mu_{eff}$ is the effective viscosity of the slurry, $\gamma$ is the applied shear rate, and K and n are empirically determined constants. Of course, this expression only represents an idealized fluid, as it would require an infinite viscosity as the shear rate decreased to zero, which is unachievable by any fluid. This relationship, therefore, may only hold true within a moderate range of shear rates and would taper off at particularly high or low shear rates as seen clearly in the 4% FS sample shown in FIG. 3.

Figure 4:
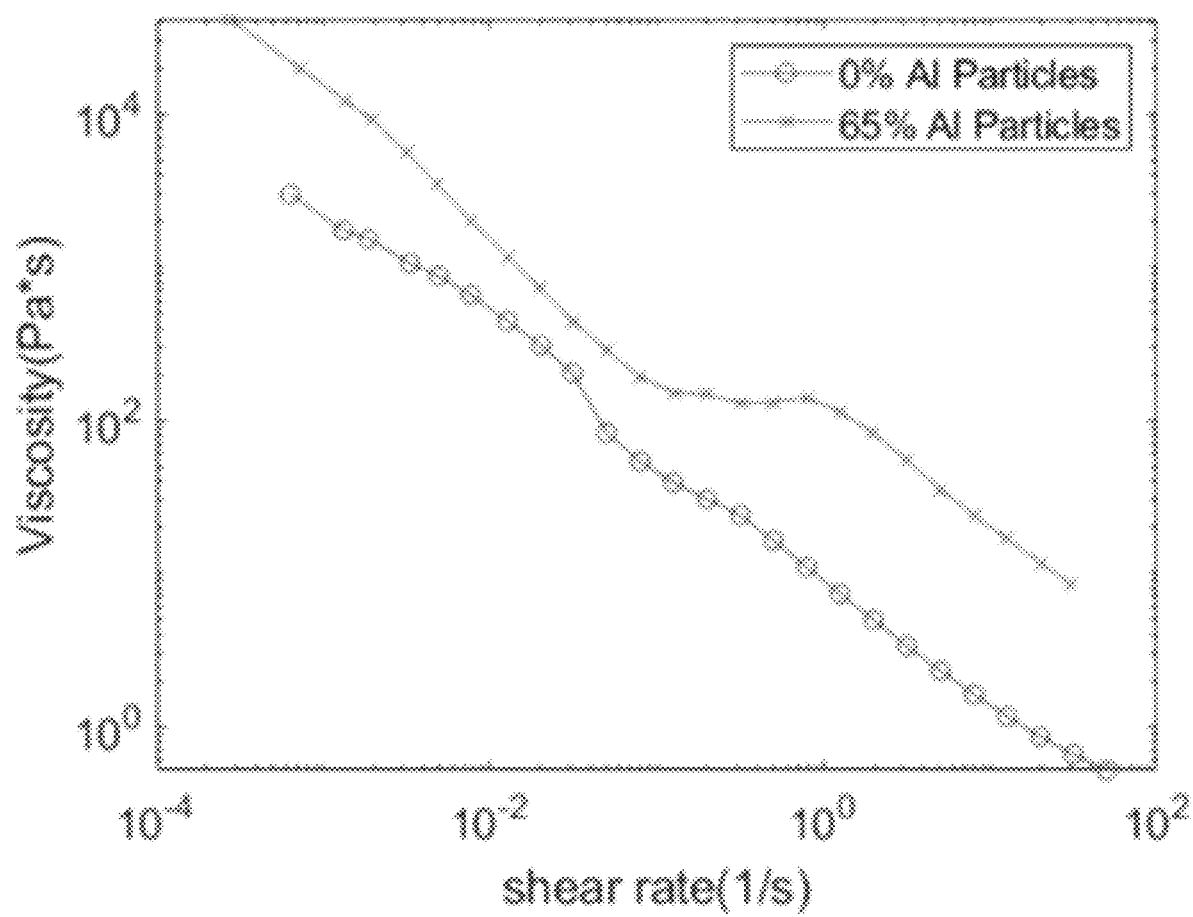
FIG. 4 is a plot of measured viscosity as a function of shear rate for two samples, where the first sample is a mixture of mineral oil with 8% FS by mass with no aluminum, and the second sample is the same fluid mixture as the first sample but containing aluminum particles such that the final mixture has 65% aluminum by mass, according to some embodiments.

As aluminum was added to the oil mixture, the final fluid viscosity was observed to increase. This could be due to the fact that particles in suspension acted as obstacles to one another during flow. This effect was considered during the development of a slurry aluminum fuel because it meant that the final fuel mixture would be of significantly higher viscosity than the originally measured oil-FS mixture. This increase in viscosity was, in fact, seen when adding large mass fractions of aluminum particles to the carrier fluid, as shown in FIG. 4. FIG. 4 shows a plot of measured viscosity as a function of shear rate for two samples, where the first sample is a mixture of mineral oil with 8% FS by mass, with no aluminum, and the second sample the same mixture but after having added sufficient aluminum particles such that the final mixture was 65% aluminum by mass.

It is common for liquids to become less viscous and to exhibit decreased, surface tension when heated, therefore, testing was done to determine the effects of increased temperature on the viscosity of the slurry fuel. Use for this fuel can range across a broad range of steady state environments, from deep ocean to deserts; therefore, the fuel should not degrade or have the aluminum fall out of suspension under such conditions. For this reason, viscosity tests were done at 7° C., 25° C., and 45° C., to observe the any changes that may occur. In each of these tests, the fuel mixture used was a mixture that was 32.2% Mineral oil, 2.8% FS (which corresponds to a carrier fluid mixture that was originally 8% FS by mass, as characterized in FIG. 3), and 65% aluminum powder, by mass. The first, low temperature test was done where fuel was initially measured at a baseline of 25° C., then measured at 7° C. (Ideally the test would be conducted at temperatures as low as 3° C., because that is the average temperature of the deep ocean, however the cooling capabilities of the rheometer used only allowed for tests as low as 7° C.), then brought back to 25° C. and measured again. The elevated temperature test was similarly measured at a baseline of 25° C., then measured at 45° C., and again brought back to 25° C. and measured. This measurement before and after the thermal change was done in order to ensure that no permanent degradation occurred during the change in temperature. The results of these tests can be seen in FIG. 5 and FIG. 6.

In both sets of temperature variation test, the observed changes in viscosity were incredibly low and were likely due to the expected rheometer error. Additionally, several samples exhibited a viscosity peak at a shear rate of approximately 0.5 (1/s), while the exact cause for this observation is unknown, it may have been due to samples slipping slightly relative the rheometer as its rotational speed began to increase significantly and the fluid experienced a transition in flow regimes.

This lack of significant temperature dependence within a standard operating range is expected, as the mineral oil used is safe for long term storage in temperatures as high as 49 C, and the FS provided by Aerosil only begins to degrade at temperatures as high as 300 C.

Example: Settling Time

The slurry aluminum fuel should have a long settling time so that the fuel can maintain a long shelf life and will not clog while flowing through a system. Initial attempts to calculate the settling time of the aluminum particles in thickened oil employed physics-based fluid models. These attempts were done using equations for the expected shear rate of a power-law fluid over a sphere. These equations however, assume that the fluid maintains ideal shear thinning properties even at incredibly low shear rates, which is not the case for the samples discussed here. This theoretical analysis therefore resulted in expected settling times much higher than what is actually observed.

Figure 7:
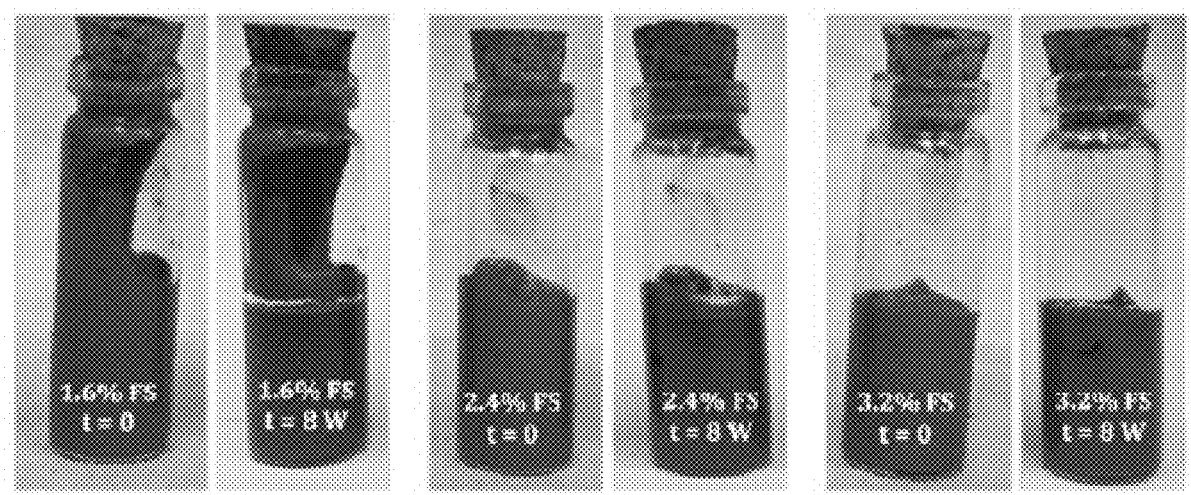
FIG. 7 shows images of activated aluminum fuel slurries in settling time tests performed with samples having different mass fractions of fumed silica (FS): leftmost set of images is of a sample with 1.6% FS after initial pipetting (left) and then 8 weeks later (right); center set of images is of a sample with 2.4% FS, and rightmost set of images is of a sample with 3.2% FS, according to some embodiments.

For these reasons, an accurate predicted settling time could not be found and instead a simple experimental test was performed. Three sets of samples were made, each prepared with 60% aluminum particles suspended in mineral oil and FS. The samples were 1.6%, 2.4%, and 3.2% FS, by mass (which corresponds to carrier fluid mixtures that were originally 4%, 6% and 8% FS by mass, as characterized in FIG. 3) and therefore each had a significantly different viscosity. These samples were pipetted into a glass jar and allowed to sit undisturbed for 8 weeks. The results can be seen in FIG. 7.

The samples with higher mass fractions of FS showed less settling over the 8 week testing period. The 1.6% sample showed a significant oil layer buildup at the surface after 8 weeks indicating some settling of the aluminum particles out of the oil. The 2.4% samples also showed some slight oil layer buildup after 8 weeks as is indicated by the dark line forming at its surface. The 3.2% sample did not show significant oil buildup on its surface, indicating that 3.2% was a sufficient concentration of FS to prevent the settling of these aluminum particles on the time scale of months (although a small bubble was seen to have formed in the 3.2% sample, that was simply due to initial pipetting error and not any settling within the slurry).

Example: Pumping Tests

Clogging may occur during pumping of a slurry for two primary reasons. The first of which is if the aluminum particles are not held in suspension long enough, and they settle so quickly that they settle, clump, and clog all while being pumped. The second is if there is too much aluminum in the mixture relative to the oil. In this case the particles will cease to become suspended and behave as a fluid, instead behaving as moist granular flow which is subject to clogging. For these reasons, pumping tests were used to determine both the necessary viscosity of the fluid as well as the allowable aluminum concentration.

The pumping tests described in this section were done by using a syringe pump to dispense the fuel samples onto a mass balance in increments of 100 µl. The syringe used had a nozzle 2.5 mm in diameter, and the fluid was dispensed at a rate of 300 µl/min. Each sample was then weighed, and the density of the sample was determined. A successful pumping test is one in which the fuel can be pumped in a homogenous fashion, and the density from sample to sample has very little variation. In tests which exhibited clogging, large changes in density from sample to sample were observed and the syringe inevitably jammed.

Figure 8A:
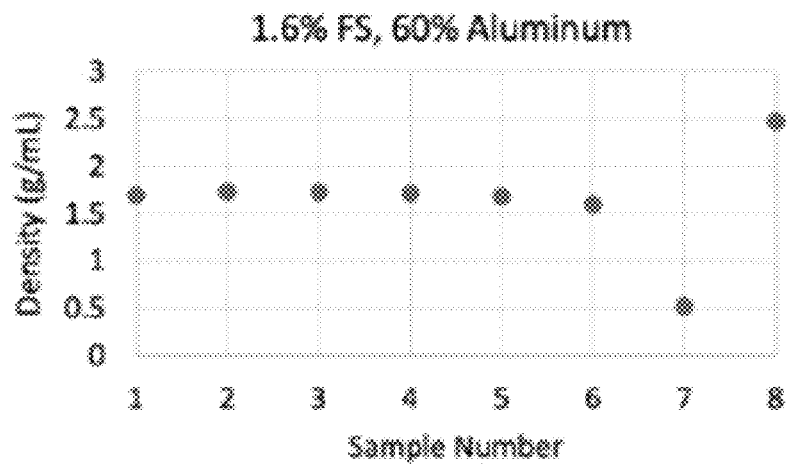
FIG. 8A is a plot showing the measured density of different 100 µl pumped samples of slurry aluminum fuel, where the fuel mixtures contained 1.6% and 60% aluminum, according to some embodiments.
Figure 8B:
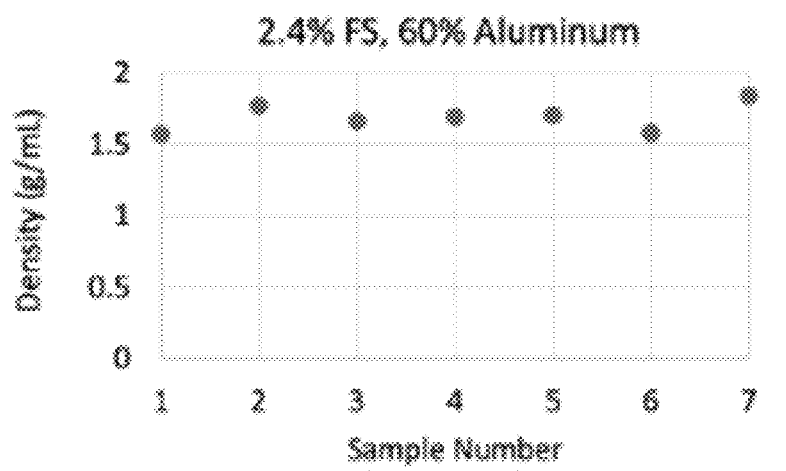
FIG. 8B is a plot showing the measured density of different 100 µl pumped samples of slurry aluminum fuel, where the fuel mixtures contained 2.4% and 60% aluminum, according to some embodiments.

After observing that increasing the concentration of FS in the fuel can be used to increase the fuels viscosity, it was then determined what concentration of FS would be sufficient to keep the aluminum particles in suspension. This was done by both settling time tests, as discussed under the section heading "Settling Time" above, as well as pumping tests. The pumping tests, shown in FIGS. 8A-8C, were tests of three different aluminum fuel samples. Each sample had the same concentration of aluminum particles but was made using different concentrations of FS and therefore had significantly different viscosities. The concentrations of FS used were 1.6%, 2.4%, and 3.2% by mass of the final fuel sample, which correspond to 4%, 6%, and 8% concentrations within the just the oil-FS mixture, respectively.

Figure 8C:
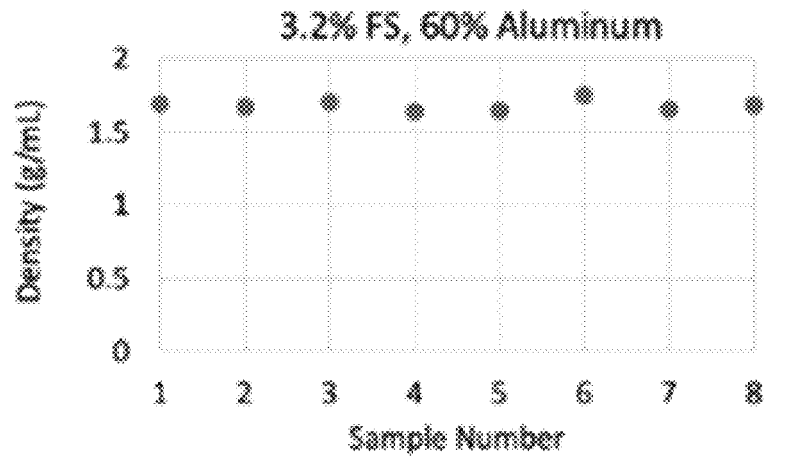
FIG. 8C is a plot showing the measured density of different 100 µl pumped samples of slurry aluminum fuel, where the fuel mixtures contained 3.2% and 60% aluminum, according to some embodiments.

As seen in FIG. 8C, the 3.2% sample was most stable, showing the least variation in mass flow between samples. The 2.4% sample similarly showed little variation between samples indicating a steady flow, see FIG. 8B. The 1.6% sample, however, experienced significant variation in mass flow in later samples, due to the presence of a clog, see FIG. 8A. This clogging indicates that the sample did not have sufficient viscosity to maintain a homogenous particle suspension throughout the flow test. Based on the stability seen for the 3.2% sample here, as well as stability observations from the settling time tests discussed above under the section heading "Settling Time", 3.2% FS was chosen as the desired FS concentration for future testing samples. This corresponds to a carrier fluid mixture that is 92% mineral oil and 8% FS by mass.

Example: Aluminum Concentration Selection

A drawback to the use of a slurry aluminum fuel is that carrying around oil lowers the fuels net energy density. For this reason, it may be desirable that a slurry aluminum fuel have as high a concentration of aluminum in it as possible, thereby minimizing the presence of unnecessary oil and increasing the fuels net energy density. These concentrations can only be taken so far, as a suspension that contains too many particles and not enough carrier fluid will begin to behave more like a granular cluster of particles than a liquid.

A series of tests were done to determine the maximum amount of aluminum powder that can be added to the tested fuel while still maintaining a pumpable liquid. Initial observations had shown that 60% aluminum was an acceptable concentration to add while still having fuel that behaved fully as a liquid. Therefore, for these tests, fuels with 60%, 65%, and 70% aluminum by mass were pumped, to determine at which point a sample would fail the pump test and show clogging. However, embodiments in which different carrier fluids with different percentages of particles are present are also contemplated as described above.

Figure 9A:
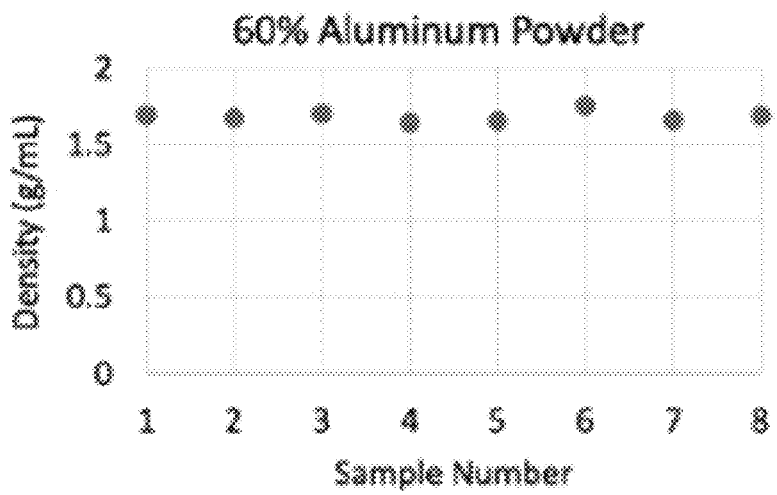
FIG. 9A is a plot showing the measured density of different 100 µl pumped samples of slurry aluminum fuel, where the fuel mixtures contained 60% aluminum, according to some embodiments.
Figure 9B:
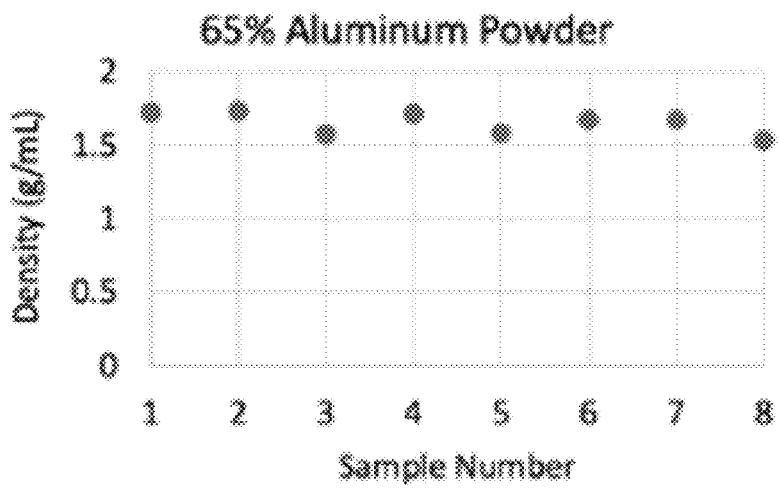
FIG. 9B is a plot showing the measured density of different 100 µl pumped samples of slurry aluminum fuel, where the fuel mixtures contained 65% aluminum, according to some embodiments.
Figure 9C:
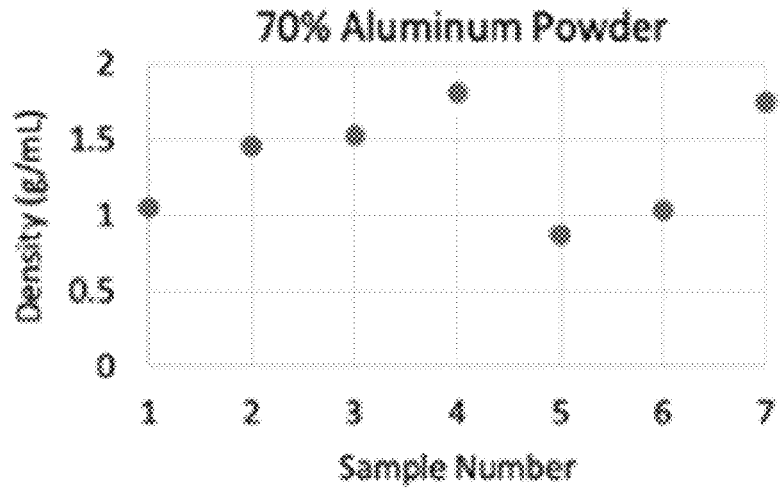
FIG. 9C is a plot showing the measured density of different 100 µl pumped samples of slurry aluminum fuel, where the fuel mixtures contained 70% aluminum, according to some embodiments.

As seen in FIG. 9, both the 60% and 65% aluminum samples showed stability and homogeneity between samples. Once the aluminum fuel concentration went as high as 70%, however, the mass flow began to vary significantly between samples, indicating significant clumping and clogging while being pumped.

For this reason, 65% aluminum concentrations were determined as a maximum allowable concentration of aluminum used in the testing of the slurry fuel samples. While these samples are 65% aluminum by mass, they are only 40% aluminum by volume due to the significant density discrepancy between aluminum and oil. Other industries, such as the ceramics industry, have shown the ability to maintain and flow particle suspensions with concentrations as high as 63% by volume. It is therefore believed that in future work this 40% limit for current slurry aluminum fuels may be pushed further. Particularly with the use of smaller aluminum particles, it is believed that this concentration has the potential to be increased significantly while still maintaining smooth flow.

Example: Reaction Testing

Figure 10:
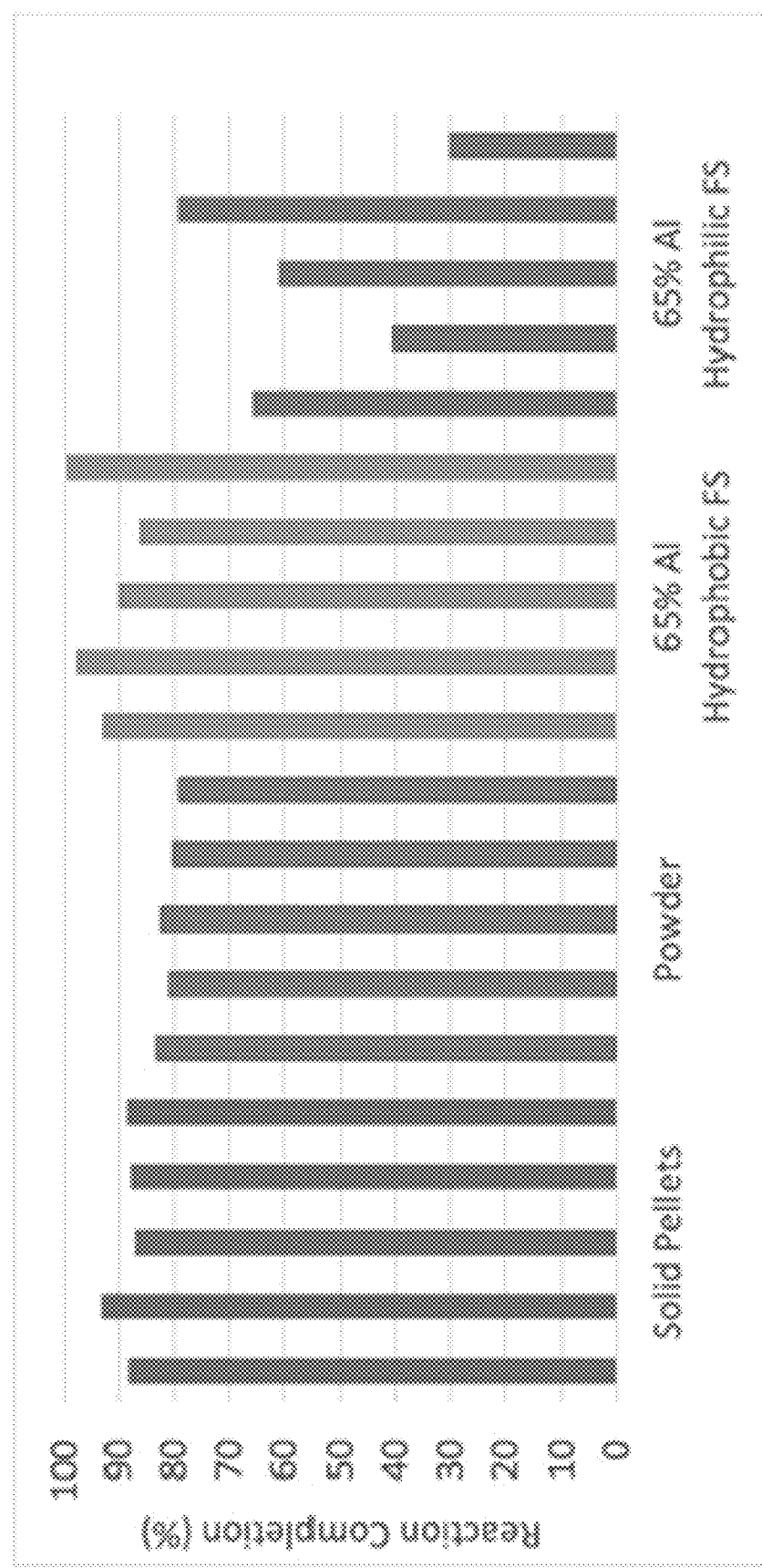
FIG. 10 is a plot showing the degree of reaction completion for samples reacted as solid aluminum fuel, ground aluminum powder, and slurry aluminum suspensions that contained hydrophobic fumed silica and hydrophilic fumed silica, according to some embodiments.

The results of the reaction tests are shown in FIG. 10. The fuel made using hydrophilic fumed silica, Aerosil 300, did not exhibit reaction completion at the levels of the hydrophobic fuel using Aerosil R812. Additionally, the reaction completion levels for the hydrophobic slurry fuel were quite high. Notably, they were even higher than those observed for the aluminum powder and the aluminum spheres.

This increase in observed reaction completion when using slurry aluminum fuel as compared to aluminum powder and spheres may be due to several possibilities. The first of which is the possibility that the mineral oil may be degrading and outgassing when elevated to the reaction temperatures of 100 C. Any gas produced by the mineral oil would be measured incorrectly as hydrogen and would therefore skew the results to indicate higher reaction yields than what actually existed. Upon further investigation however, a flask of mineral oil was heated to 100 C for 30 minutes and no outgassing was observed whatsoever, making this theory unlikely.

The most likely possibility for this increase in observed reaction completion is that the slurry fuel mixture was not exactly 65% aluminum by mass. In order to determine reaction yield, the hydrogen produced in each reaction is compared against the ideal hydrogen output expected from that mass of fuel. If the fuel were to be a higher mass fraction of aluminum than expected, then the reaction would naturally produce more hydrogen than expected and the reaction yield data would be skewed. The mixture was made very carefully to ensure accurate concentrations of each component, however, because these samples were being made at a scale of only 10 mL each, a slight error, or even the preferential wetting of oil versus aluminum to certain instruments, could easily throw off the mixture concentration by a few percent. In fact, when measuring the density of the fuel used for these tests, it matched more closely with the expected density for a 68% aluminum mixture. If the expected reaction yield is adjusted to account for a 68% mixture rather than a 65% mixture, then the average slurry fuel reaction yield drops to 89%, which is similar to the yield produced by the solid aluminum fuel. This also means that fuel can likely be produced in mass fractions as high as 68%, as no clogging was seen while pumping the fuel for the reaction testing.

An additional possibility for the reaction yield of the aluminum powder being measured as lower than the reaction yield of the slurry aluminum fuel is testing error. As mentioned above, the aluminum powder reaction is so volatile that the powder is often scattered across the reaction flask. This scattering can cause some powder to oxidize in the air within the flask or may keep some powder from coming into contact with water. This may explain the decreased reaction yield observed for the aluminum powder as compared to the aluminum spheres and the slurry aluminum fuel.

One final possibility is that the aluminum-water reaction simply occurs in a more optimal manner for high reaction completion when the aluminum is initially suspended in oil. This may be the case because the aluminum-water reaction was allowed to occur in a much more stable and controlled manner when reacting in slurry fuel. It has been theorized that breaking apart into small particles is a critical step for high reaction completions when using solid fuel. This stage is unnecessary when reacting aluminum powder, however the powder reaction is so volatile that particles may become scattered and oxidized. Reacting slurry aluminum fuel may provide a desirable combination of the different form factors, where the fuel is already ground into particles small enough to provide high levels of reaction completion, but the reaction also occurs in a steady and controlled manner to allow for substantially all of the particles to react completely.

With the reactivity of the slurry fuel measured, it was also possible to compute an effective energy density, $U_v$, and specific energy, $U_m$, for the fuel to understand the energy content by volume and mass of the fuel respectively. For these computations, the following equations (4) and (5) were used:

$$U_v = \bar{U}_v \cdot (\% \text{ Al by volume}) \cdot (\% \text{ reaction yield}) \quad (4)$$

$$U_m = \bar{U}_m \cdot (\% \text{ Al by mass}) \cdot (\% \text{ reaction yield}) \quad (5)$$

where $\bar{U}_v$ and $\bar{U}_m$ are the energy density and specific energy of pure aluminum, taken here as 83.8 MJ/L and 31 MJ/kg respectively. For the final fuel mixture containing 65 wt % activated aluminum, $U_v$ and $U_m$, were shown to have values of 28.7 MJ/L and 17.5 MJ/kg, assuming that the water required for oxidation can be harvested in situ.

Example: Analysis of Pumping Losses

As mentioned above, using a slurry fuel allows the fuel to be easily pumped throughout a system. While this is an advantage over solid fuel, it can easily become impractical if the fuel is too viscous and necessitates large pumping losses. For this reason, and as elaborated on above, in some embodiments, a fuel may be engineered to be shear thinning, so that its viscosity will decrease significantly when being pumped through a pipe. In order to determine expected pumping losses, a conservative example system was analyzed with a pipe diameter of 0.32 cm, a length of 1.5 m, and a desired flow rate of 0.13 mL/s, which was approximately the fuel flow rate needed to produce 10 slpm $H_2$. The shear rate experienced at the walls of this tube was calculated via Equation (7) below to be approximately 40 s-l:

$$\dot{\gamma} = \frac{4Q}{\pi r^3} \quad (7)$$

Figure 5:
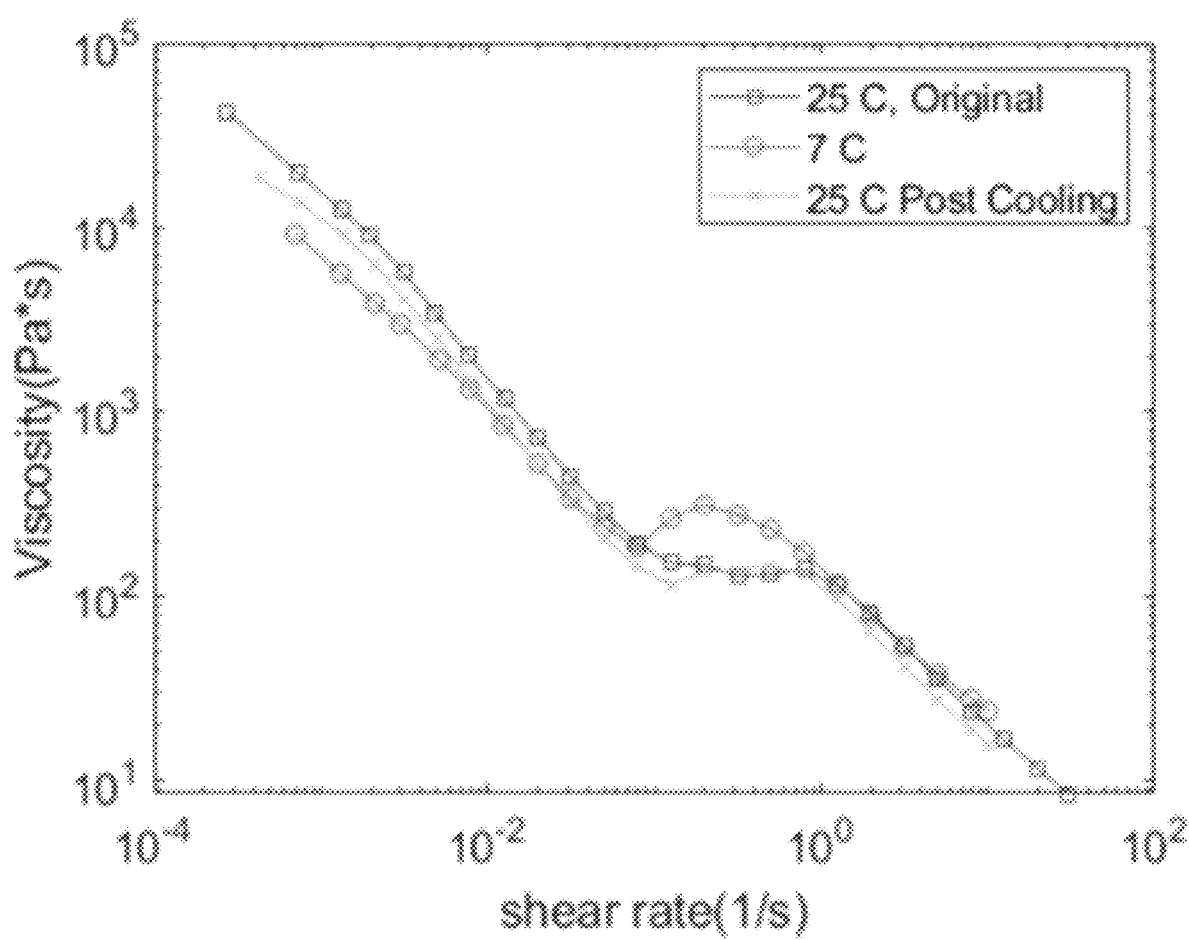
FIG. 5 is a plot of slurry fuel viscosity as a function of shear rate measured for a suspension of aluminum powder in mineral oil and fumed silica at varying temperatures to determine the effect of low temperature on the slurry's viscosity, according to some embodiments.
Figure 6:
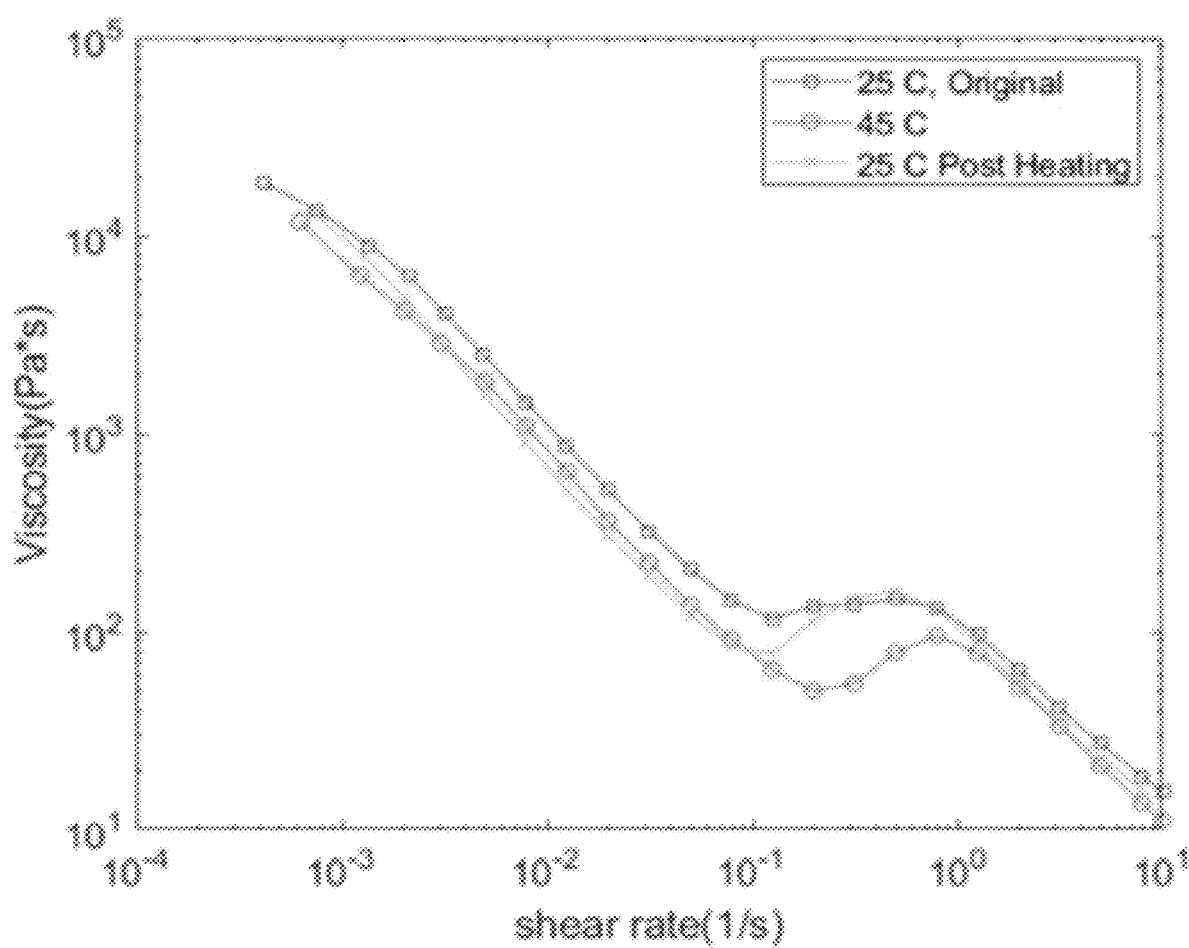
FIG. 6 is a plot of slurry fuel viscosity as a function of shear rate measured for a suspension of aluminum powder in mineral oil and fumed silica at varying temperatures to determine the effect of high temperature on the slurry's viscosity, according to some embodiments.

Given this shear rate, a conservative estimate of 10 Pa*s was made for the viscosity of the fuel using the data shown in FIG. 5. Using the viscosity, pipe geometry and flow rate, the pressure drop across such a system was estimated using Equation (8) below to be 7.6 bar:

$$\Delta P = \frac{8\mu L Q}{\pi r^4} \quad (8)$$

Finally, the power to pump this fluid was determined through the relationship shown in Equation (9):

$$\mathcal{P} = \Delta P Q \quad (9)$$

This led to a pumping pressure as low as 0.1 W. Even after accounting for inefficiencies, and assuming a pumping power of 1 W, small electrical peristaltic pumps at this scale could be used. These pumps could weigh as little as 100 grams and could be easily incorporated into a reactor system.

Example: Slurry Properties

Based on the final fuel mixture which includes 65% solid aluminum fuel, 3.2% Aerosil R812 and 31.8% mineral oil, the final mass and volumes of the constituent components could be accounted for and a final fuel energy density could be determined. Additionally, the effective energy density and specific energy of the fuel, defined in Equations (4) and (5) above which account for the reaction yield, could be determined. These final properties of the fuel are shown in Table 1 below.

TABLE 1

| Measured Properties of final slurry aluminum fuel configuration | |
|---|---|
| Measured Density of Slurry Fuel | 1.64 g/mL |
| Measured $H_2$ Production per mL Slurry Fuel | 1270 mL |
| Effective Energy Density | 28.7 MJ/L |
| Effective Specific Energy | 17.5 MJ/kg |

It should be understood that the subject matter defined in the appended claims is not necessarily limited to the specific implementations described above. The specific implementations described above are disclosed as examples only.

The invention claimed is:

1. An aluminum slurry fuel, comprising:
   a carrier fluid; and
   a plurality of activated aluminum particles dispersed in the carrier fluid, wherein the activated aluminum particles comprise aluminum combined with gallium and/or indium, and wherein the activated aluminum particles are substantially inert relative to the carrier fluid.

2. The aluminum slurry fuel of claim 1, wherein the carrier fluid is an oil.

3. The aluminum slurry fuel of claim 2, wherein the oil comprises a viscous oil.

4. The aluminum slurry fuel of claim 2, wherein the oil comprises a silicone oil.

5. The aluminum slurry fuel of claim 2, wherein the oil comprises mineral oil.

6. The aluminum slurry fuel of claim 2, further comprising an additive that acts as a thickener of the oil.

7. The aluminum slurry fuel of claim 6, wherein the aluminum slurry fuel is configured to exhibit shear thinning properties in the presence of the additive.

8. The aluminum slurry fuel of claim 6, wherein the additive comprises fumed silica.

9. The aluminum slurry fuel of claim 1, further comprising 1 wt % to 4 wt % of fumed silica based on a total weight of the aluminum slurry fuel.

10. The aluminum slurry fuel of claim 1, wherein the plurality of activated aluminum particles has an average size between or equal to 100 μm and 500 μm.

11. The aluminum slurry fuel of claim 1, wherein a weight percentage of the plurality of activated aluminum particles in the aluminum slurry fuel is between or equal to 10 wt % and 90 wt % based on a total weight of the aluminum slurry fuel.

12. The aluminum slurry fuel of claim 11, wherein the weight percentage of the plurality of activated aluminum particles in the aluminum slurry fuel is between or equal to 10 wt % and 70 wt % based on the total weight of the aluminum slurry fuel.

13. A power system comprising:
   a reactor including the aluminum slurry fuel of claim 1 disposed therein.

14. A method of generating power, the method comprising:
   mixing the aluminum slurry fuel of claim 1 with water, wherein a reaction of the plurality of activated aluminum particles with the water releases hydrogen; and
   using the hydrogen in a power system to generate power.

15. The aluminum slurry fuel of claim 1, wherein the carrier fluid has a viscosity between or equal to 50 cSt and 10,000 cSt.

16. A method of using an aluminum slurry fuel, comprising:
   mixing an aluminum slurry fuel with water, wherein the aluminum slurry fuel comprises a carrier fluid and a plurality of activated aluminum particles dispersed in the carrier fluid, wherein the activated aluminum particles comprise aluminum combined with gallium and/or indium, and wherein the activated aluminum particles are substantially inert relative to the carrier fluid.

17. The method of claim 16, wherein the carrier fluid has a viscosity between or equal to 50 cSt and 10,000 cSt.

18. The method of claim 16, further comprising reacting the plurality of activated aluminum particles with the water to generate hydrogen.

19. The method of claim 16, wherein the oil comprises a silicone oil and/or a mineral oil.

20. The method of claim 16, wherein the aluminum slurry fuel further comprises fumed silica.

21. The method of claim 20, wherein the aluminum slurry fuel comprises 1 wt % to 4 wt % of fumed silica based on a total weight of the aluminum slurry fuel.

22. The method of claim 16, wherein a weight percentage of the plurality of activated aluminum particles in the aluminum slurry fuel is between or equal to 10 wt % and 90 wt % based on a total weight of the aluminum slurry fuel.

23. The method of claim 22, wherein the weight percentage of the plurality of activated aluminum particles in the aluminum slurry fuel is between or equal to 10 wt % and 70 wt % based on the total weight of the aluminum slurry fuel.

24. The method of claim 16, wherein the plurality of activated aluminum particles has an average size between or equal to 100 μm and 500 μm.

\* \* \* \* \*